C. A. FRENCH.
Piano Trucks.
No. 142,386.
Patented September 2, 1873.
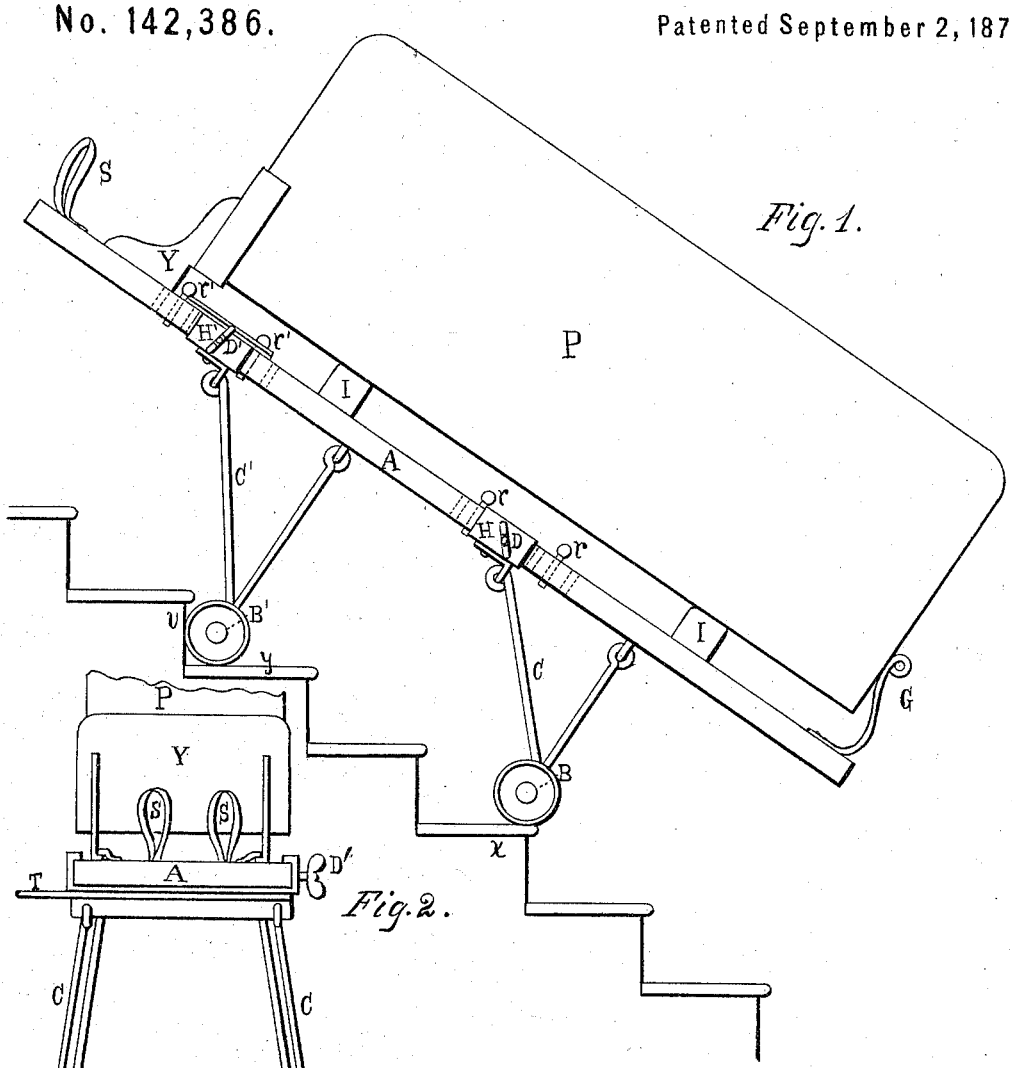
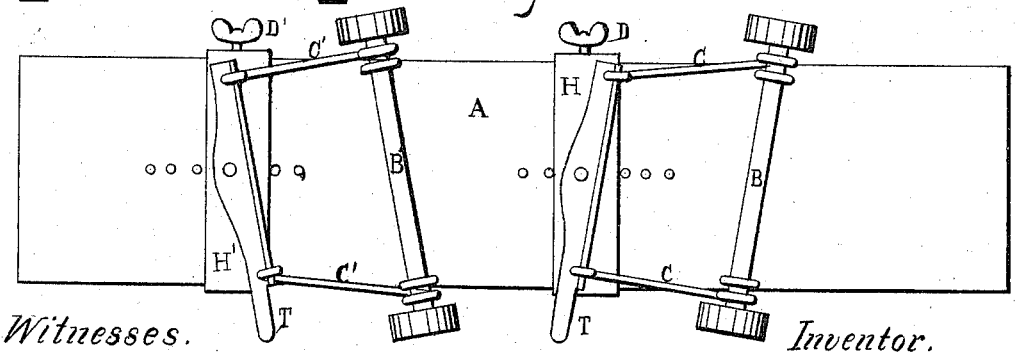
Witnesses.
Benj'n Gartside
B. W. Gartside
Inventor.
Chas. Albert French

UNITED STATES PATENT OFFICE.

CHARLES A. FRENCH, OF DAVENPORT, IOWA.

IMPROVEMENT IN PIANO-TRUCKS.

Specification forming part of Letters Patent No. 142,386, dated September 2, 1873; application filed April 19, 1873.

*To all whom it may concern:*

Be it known that I, CHAS. A. FRENCH, of Davenport, State of Iowa, have invented a Piano-Truck, of which the following is a specification:

The object of my invention is to convey pianos in and out of wagons, up or down straight or winding stairs, and over sidewalks, by the combination of hinged trucks B B' and sliding braces C C', as shown in the plan view, Figure 1, of the accompanying drawing. The truck is illustrated more in detail in the end view, Fig. 2, and in the plan view of the under side of the truck, Fig. 3.

The piano rests on cushions I I, and is held erect by and between the goose-necks G and yoke Y, (the latter being adjusted back and forth for the variation in the length of different pianos.) The trucks B B' are permanently hinged to the bed A in such a manner that they can be swung far enough either way to adjust the trucks for the variation of the grade, or run of different stairs, (so that while one truck is rolling on the stair $x$ the other truck is being raised to the stair $v$,) and are secured at any position by the sliding braces C C', one end of which is secured to the axles B B', and the other ends to the sliding heads H H', which are secured to the bed A, when the trucks are adjusted to the right position. When the stairs are very steep the sliding heads H H' are allowed to vibrate freely between the pins $r\ r'\ s\ s'$, (which are put in any of the series of holes in the bed A made for that purpose,) so that when the wheels of the truck B' strike the riser of the stair $y$ the machine is still pushed forward until the sliding head H' strikes the pin $r'$; by this time the other wheels of the truck B are fully resting on the stair $x$.

In going up or down winding stairs the axles B B are twisted out of parallel, as shown in Fig. 3, by means of the levers T T.

It will be evident that the sliding braces may be made to run in independent grooves in the bed A, thus dispensing with the sliding heads altogether.

I do not claim the hinging of the trucks to the bed.

I claim—

The trucks B B', in combination with the sliding braces C C', hinged to the bed A, for adjusting the trucks for the variation of different stairs, substantially as described.

CHAS. ALBERT FRENCH.

Witnesses:
   BENJ. GARTSIDE,
   B. W. GARTSIDE.